(12) United States Patent
Edwards et al.

(10) Patent No.: US 11,551,372 B2
(45) Date of Patent: Jan. 10, 2023

(54) SYSTEM FOR ITEM PLACEMENT INTO NON-RIGID CONTAINERS

(71) Applicant: Walmart Apollo, LLC, Bentonville, AR (US)

(72) Inventors: James Benjamin Edwards, Fayetteville, AR (US); Brian C. Roth, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 303 days.

(21) Appl. No.: 17/035,091

(22) Filed: Sep. 28, 2020

(65) Prior Publication Data

US 2021/0097709 A1   Apr. 1, 2021

Related U.S. Application Data

(60) Provisional application No. 62/909,050, filed on Oct. 1, 2019.

(51) Int. Cl.
*G06T 7/73* (2017.01)
*G06T 7/70* (2017.01)
(Continued)

(52) U.S. Cl.
CPC ............... *G06T 7/70* (2017.01); *B25J 9/1669* (2013.01); *B25J 9/1679* (2013.01); *B25J 9/1697* (2013.01);
(Continued)

(58) Field of Classification Search
CPC ... B25J 9/163; G06T 7/20; G06T 7/70; H04N 7/18; H04B 3/02; G06K 9/00362;
(Continued)

(56) References Cited

U.S. PATENT DOCUMENTS

| 9,744,669 B2 | 8/2017 | Wicks et al. |
| 10,926,952 B1 * | 2/2021 | Shi .................. G06N 3/08 |

(Continued)

FOREIGN PATENT DOCUMENTS

| EP | 2977942 B1 | 10/2019 |
| WO | 2019103880 A1 | 5/2019 |

OTHER PUBLICATIONS

Young, Lee, "International Search Report", International Application No. PCT/US2020/053115, dated Jan. 5, 2021, 2 pages.

(Continued)

*Primary Examiner* — Phuoc H Doan (57) ABSTRACT

Examples provide a system and method for autonomously placing items into non-rigid containers. An image analysis component analyzes image data generated by one or more cameras associated with picked items ready for bagging and/or a non-rigid container, such as, but not limited to, a bag. The image analysis component generates dynamic placement data identifying how much space is available inside the bag, bag tension, and/or contents of the bag. A dynamic placement component generates a per-item assigned placement for a selected item ready for bagging based on a per-bag placement sequence and the dynamic placement data. Instructions, including the per-item assigned placement designating a location within the interior of the non-rigid container to the selected item and an orientation for the selected item after bagging, is sent to at least one robotic device. The robotic device places the selected item into the non-rigid container in accordance with the instructions.

20 Claims, 9 Drawing Sheets

(51) Int. Cl.
  *H04N 5/225* (2006.01)
  *H04N 5/38* (2006.01)
  *B25J 9/16* (2006.01)
  *G06T 7/00* (2017.01)
  *G06V 20/10* (2022.01)

(52) U.S. Cl.
  CPC ............ *G06T 7/0004* (2013.01); *G06V 20/10* (2022.01); *H04N 5/2253* (2013.01); *H04N 5/38* (2013.01); *G06T 2207/30108* (2013.01)

(58) Field of Classification Search
  CPC ........ B65G 1/1373; G06N 3/08; G06Q 50/28; G06Q 30/0639; G06Q 30/0641
  USPC ......................... 382/103; 700/213; 318/568.1
  See application file for complete search history.

(56) References Cited

U.S. PATENT DOCUMENTS

| | | |
|---|---|---|
| 2010/0200450 A1 | 8/2010 | Weed |
| 2019/0241298 A1 | 8/2019 | Brooks et al. |
| 2021/0158430 A1* | 5/2021 | Buibas ................. G06V 10/255 |

OTHER PUBLICATIONS

Young, Lee, "Written Opinion", International Application No. PCT/US2020/053115, dated Jan. 5, 2021, 7 pages.

\* cited by examiner

SYSTEM FOR ITEM PLACEMENT INTO NON-RIGID CONTAINERS

BACKGROUND

Grocery order pickup automation currently involves placing purchased items into a reusable, rigid tote or box. After which, the items are placed into bags for customer pickup. Placing items into a bag in the same way that items are placed into a rigid container is problematic because items do not always settle the way they are placed inside a bag because the shape of a bag is irregular and inconsistent. Moreover, the shape and orientation of the items already placed inside the bag can affect settling location and final disposition of the next item being placed into the bag. Therefore, picked items are currently bagged manually be one or more human users for pickup by a customer. This is a time-consuming, inefficient and labor-intensive process.

SUMMARY

Some examples provide a set of image capture devices generating image data associated with a non-rigid container. An image analysis component generates dynamic placement data associated with the non-rigid container. The dynamic placement data comprises at least one of available space data associated with unoccupied space within the non-rigid container and bag content data associated with a set of items already placed within an interior of the non-rigid container. A dynamic placement component identifies a per-item assigned placement for a selected item ready for placement into the non-rigid container based on the per-bag placement sequence and the dynamic placement data. The per-item assigned placement comprising a location within the interior of the non-rigid container and an orientation of the selected item after placement into the non-rigid container. A robotic device places the selected item into the interior of the non-rigid container in accordance with the per-item assigned placement within the non-rigid container. The image analysis component analyzes updated image data to update the dynamic placement data based on a final location and orientation of the selected item after placement of the selected item inside the non-rigid container.

Other examples provide a computer-implemented method for placing items into non-rigid containers by a set of robotic devices. An image analysis component generates dynamic placement data associated with the non-rigid container based on image data received from a set of image capture devices associated with a non-rigid container. A dynamic placement component identifies a per-item assigned placement for a selected item ready for placement into the non-rigid container based on the per-bag placement sequence and the dynamic placement data. The per-item assigned placement comprising a location within the interior of the non-rigid container and an orientation of the selected item after placement into the non-rigid container. A communications interface component sends a set of instructions to at least one robotic device configured to place the selected item into the interior of the non-rigid container in accordance with the per-item assigned placement within the non-rigid container.

Still other examples provide one or more computer storage devices, having computer-executable instructions for a placing items into non-rigid containers by a placement manager component that, when executed by a computer cause the computer to generate dynamic placement data associated with the non-rigid container. A per-item assigned placement is identified for a selected item ready for placement into the non-rigid container based on the per-bag placement sequence and the dynamic placement data. Instructions for placing the item into the non-rigid container in accordance with the per-item assigned placement is sent to a robotic device configured to place the selected item into the non-rigid container in accordance with the instructions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable automatic bagging of items for completion of a customer order. In some examples, a placement manager component analyzes real-time image data of the interior of a bag or other non-rigid container to identify boundaries of the bag, tension on the bag, the amount of available open space inside the bag for adding additional items, location and orientation of items already inside the bag, etc. The placement manager component assigns a location and orientation to a new item being placed into the bag dynamically during the bagging process to ensure proper bagging of items efficiently without human intervention.

Figure 1:
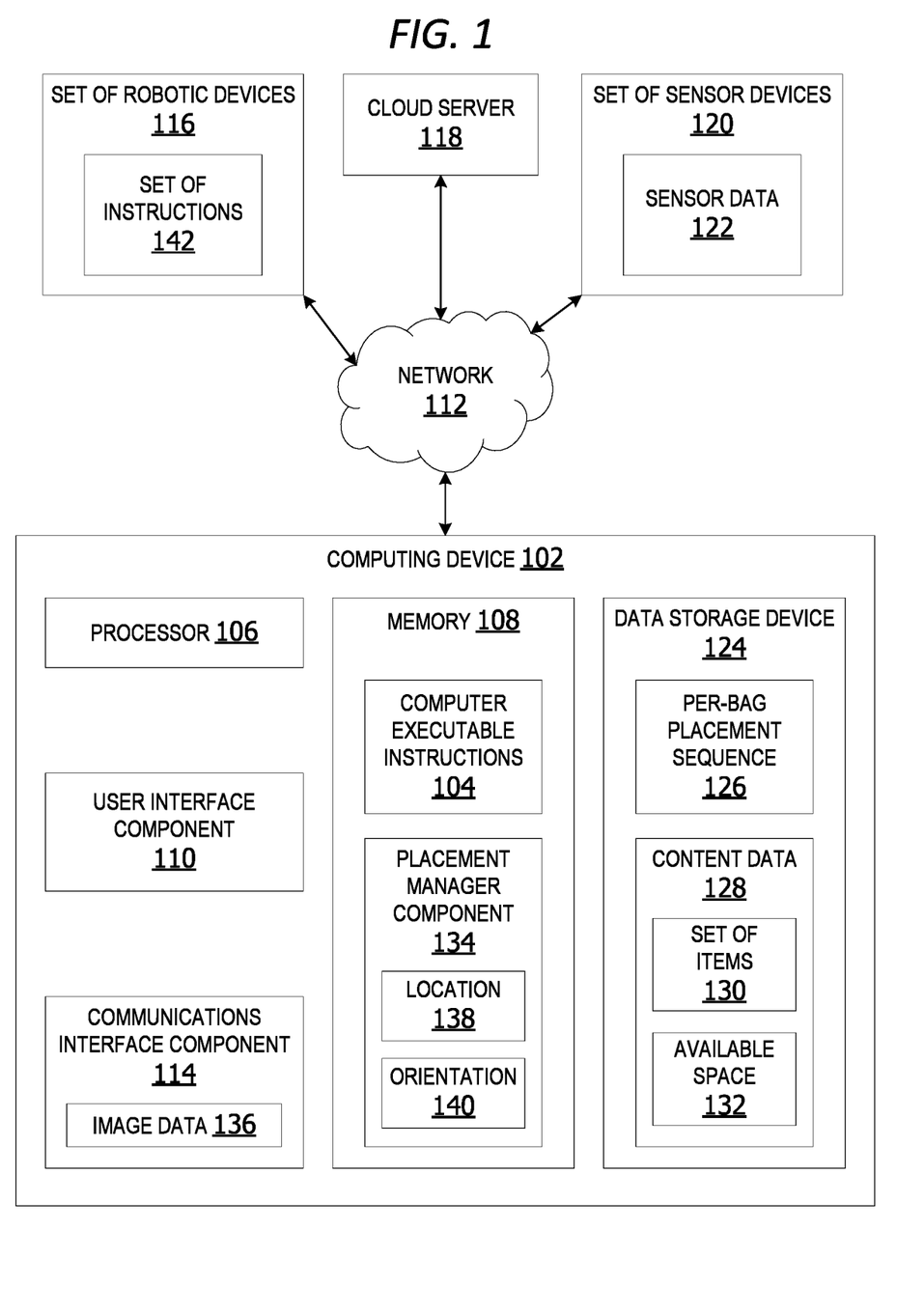
FIG. 1 is an exemplary block diagram illustrating a system for automatically placing items into non-rigid containers.

Referring again to FIG. 1, an exemplary block diagram illustrates a system 100 for automatically placing items into non-rigid containers. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes an optional user interface component 110.

The processor 106 includes any quantity of processing units, and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 8, FIG. 9, FIG. 10 and FIG. 11).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to a set of robotic devices 116, a cloud server 118 and/or a set of sensor devices 120, can occur using any protocol or mechanism over any wired or wireless connection. In some examples, the communications interface component 114 is operable with short range communication technologies such as by using near-field communication (NFC) tags.

The set of robotic devices 116 includes one or more robotic devices for placing items into one or more non-rigid containers. The set of robotic devices 116 provides pickup automation using computer vision for placing items into bags without human intervention.

A non-rigid container is any type of flexible container, such as a bag. The non-rigid container can be, without limitation, a plastic bag, a cloth bag, a paper bag, or any other type of bag.

A cloud server 118 is a logical server providing services to the computing device 102 or other clients. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The set of sensor devices 120 is a set of one or more sensors generating sensor data 122 associated with the non-rigid container and/or the one or more items being placed into the non-rigid container. A sensor in the set of sensor devices 120 can include, for example but without limitation, one or more image capture devices, one or more weight sensors, one or more temperature sensors, one or more motion sensors, one or more pressure sensors, or any other type of sensor device.

The system 100 can optionally include a data storage device 124 for storing data, such as, but not limited to per-bag placement sequence 126 and/or content data 128. The per-bag placement sequence 126 is a sequence/order in which items are placed into each non-rigid container. For example, if a customer order includes two boxes of crackers and a carton of eggs, the per-bag placement sequence 126 can specify that the two boxes of crackers are placed into the bag first and the carton of eggs are placed into the bag last. In another example, if a customer order includes a box of cereal and a loaf of bread, the per-bag placement sequence 126 can specify that the box of cereal be placed into the bag first and the loaf of bread be placed into the bag last so the cereal box won't crush the bread.

The content data 128 is data describing the contents/interior of the non-rigid container. The content data 128 in some example include data identifying each item in a set of items 130 inside the non-rigid container. The set of items 130 can be a null set of items (empty bag), a single item, as well as two or more items.

The content data 128 in other examples can include data describing available space 132. The available space 132 is the volume of unoccupied space inside the interior of the non-rigid container. The available space 132 indicates how much room is available inside the bag for adding more items into the bag.

The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In other examples, the data storage device 124 includes a database.

The data storage device 124 in this example is included within the computing device 102, attached to the computing device, plugged into the computing device or otherwise associated with the computing device 102. In other examples, the data storage device 124 includes a remote data storage accessed by the computing device via the network 112, such as a remote data storage device, a data storage in a remote data center, or a cloud storage.

The memory 108 in some examples stores one or more computer-executable components, such as, but not limited to, a placement manager component 134. In some examples, the placement manager component 134 analyzes image data generated by one or more image capture devices in the set of sensor devices 120. The communications interface component 114 receives the image data 136 from the set of sensor devices 120 via the network 112.

The placement manager component 134 generates dynamic placement data associated with the non-rigid container based on image data received from a set of image capture devices associated with a non-rigid container. The dynamic placement data in some examples includes a location 138 and/or an orientation 140 of each item in the set of items 130 already placed inside the non-rigid container. The placement manager component 134 generates a set of instructions 142 including instructions for at least one robotic device in the set of robotic devices 116 to place at least one item into at least one non-rigid container based on the per-bag placement sequence 126, the content data 128, the location 138 of each item already in the non-rigid container and/or the orientation 140 of each item placed into the non-rigid container.

Figure 2:
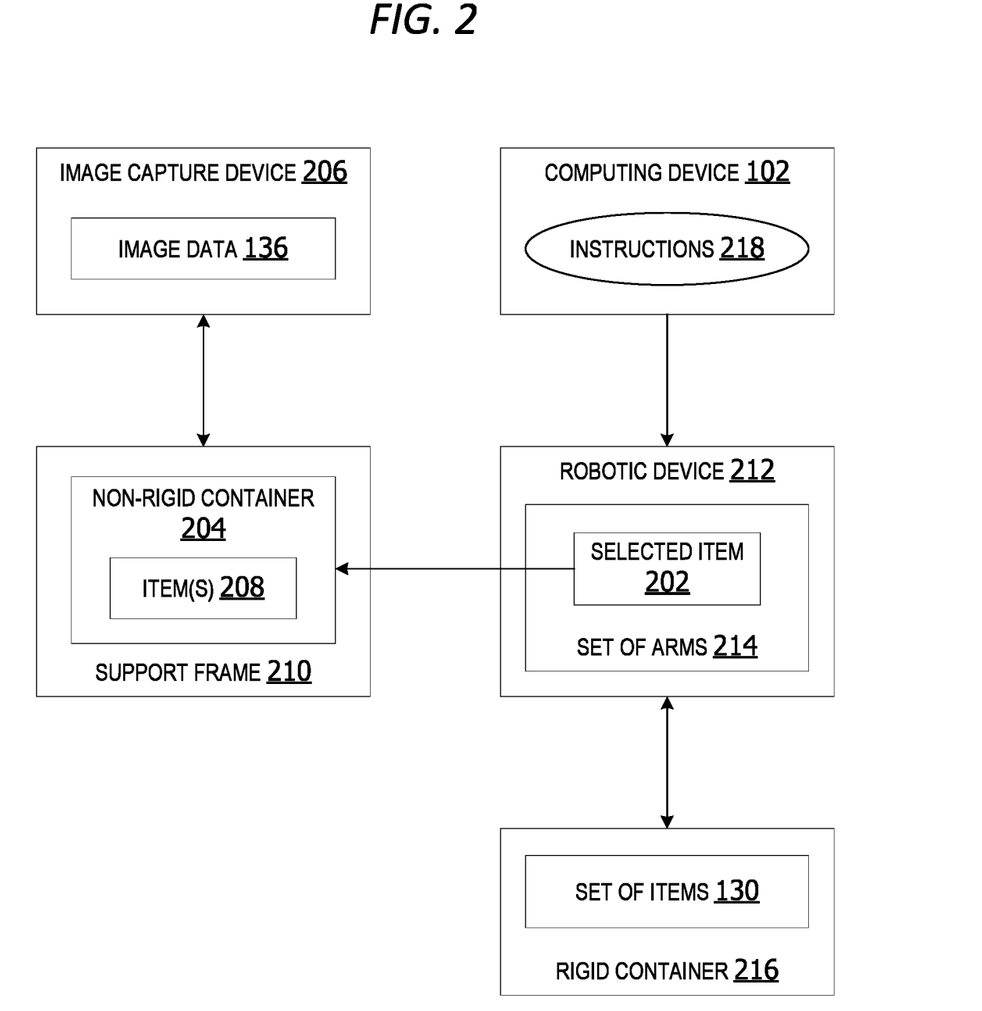
FIG. 2 is an exemplary block diagram illustrating a system for automatically placing a selected item into an assigned non-rigid container.

FIG. 2 is an exemplary block diagram illustrating a system 200 for automatically placing a selected item 202 into an assigned non-rigid container 204. The system 200 in some non-limiting examples includes one or more image capture device(s) 206 generating image data 136 associated with one or more item(s) 208 already placed inside the non-rigid container 204 supported on a support frame 210.

The support frame 210 is any type of frame or device for supporting a flexible or non-rigid container, such as a bag, in an open position as items are placed into the container by the robotic device 212. In some non-limiting examples, the robotic device 212 is a device for automatically moving picked items from a rigid container 216 into the non-rigid container 204, such as, but not limited to, a device in the set of robotic devices 116 in FIG. 1.

The rigid container 216 is any type of container for storing picked items for fulfillment of a user's order, such as, but not limited to, an online grocery order. The rigid container 216 can include, without limitation, a tote, a box, a basket, or any other type of rigid container.

The robotic device 212 in this example includes a set of arms 214 for grasping/picking up one or more items. The set of arms 214 can include one or more robotic arms. An arm in the set of arms can include a grasping mechanism on one end for picking up an item and setting it down inside the non-rigid container 204. The robotic device 212 places item(s) 208 into the non-rigid container 204 in accordance with instructions 218 received from the placement manager component executing on the computing device 102.

Figure 3:
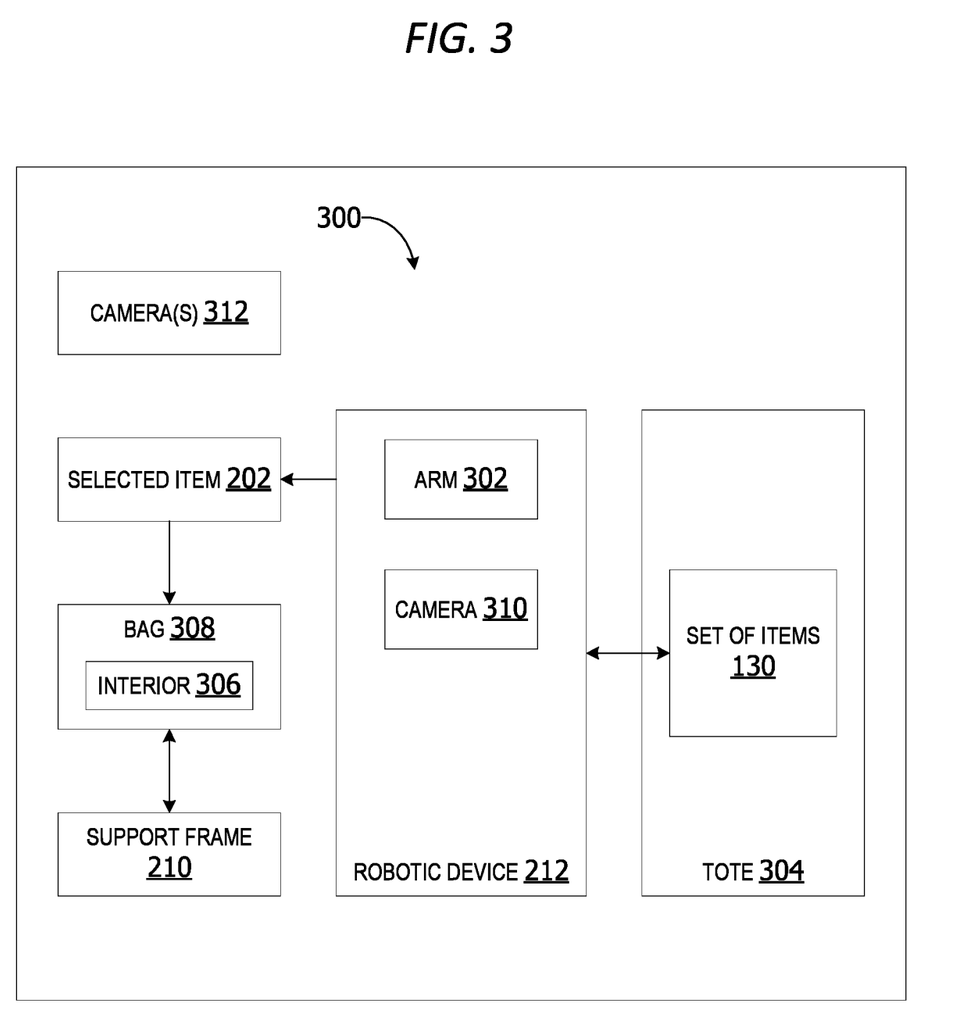
FIG. 3 is an exemplary block diagram illustrating a system including one or more cameras used during dynamic item placement into non-rigid containers.

FIG. 3 is an exemplary block diagram illustrating a system 300 including one or more cameras used during dynamic item placement into non-rigid containers. In this example, a robotic device 212 utilizes at least one arm 302 to move a set of items 130 from a rigid container, such as a tote 304, into an interior 306 of a non-rigid container, such as a bag 308, supported on the support frame 210.

The system 300 in some examples includes a set of cameras for generating image data of the bag 308 and/or the contents within the interior 306 of the bag. The set of cameras can include one or more image capture devices mounted on the robotic device 212, such as, but not limited to, the camera 310. The camera 310 captures images of the bag 308, the set of items 130 and/or the selected item 202 being placed into the bag 308. The set of cameras can also include one or more camera(s) 312 mounted above or near the one or more non-rigid container supported on the support frame 210.

Figure 4:
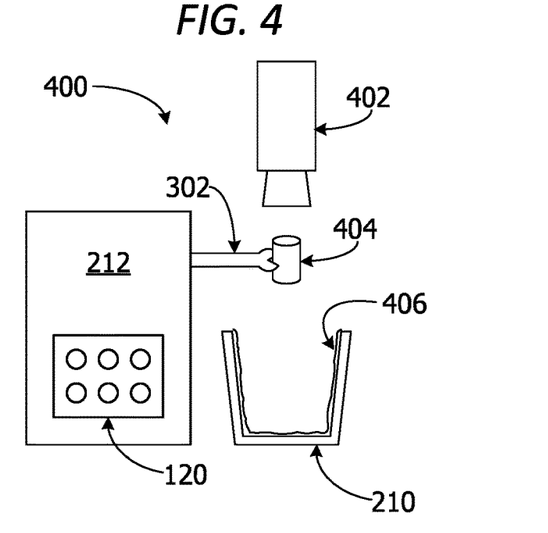
FIG. 4 is an exemplary block diagram illustrating a system for automatically placing items into a non-rigid container supported on a frame.

FIG. 4 is an exemplary block diagram illustrating a system 400 for automatically placing items into a non-rigid container supported on a frame. In some examples, a stationary camera 402 mounted above a selected item 404 and/or a bag 406 or other non-rigid container on a support frame 210 generates image data. The image data is analyzed to identify a location and orientation of the item 404 being placed into the bag 406 by the robotic device 212 which will prevent overfilling of the bag 406, tearing of the bag 406, damaging other items inside the bag or otherwise inefficiently bagging items.

In this non-limiting example, the robotic device 212 includes an arm 302 for holding/grasping or otherwise supporting the item 404 as it is being placed into the bag 406. The robotic device 212 and the arm 302 are not limited to the robotic device and arm shown in FIG. 4. The robotic device and any arm(s) associated with the robotic device can be implemented as any type of robotic device and/or any type of grasping mechanism for placing the item into the bag 406 or other rigid container without user intervention.

The support frame 210 is any type of frame for supporting the bag 406 or other non-rigid container. The support frame 210 in this example is a tote. However, in other examples, the support frame can include a box, basket, support arms, a wire frame, a rack, or any other type of support device for holding the bag 406 in an upright and/or open configuration.

Figure 5:
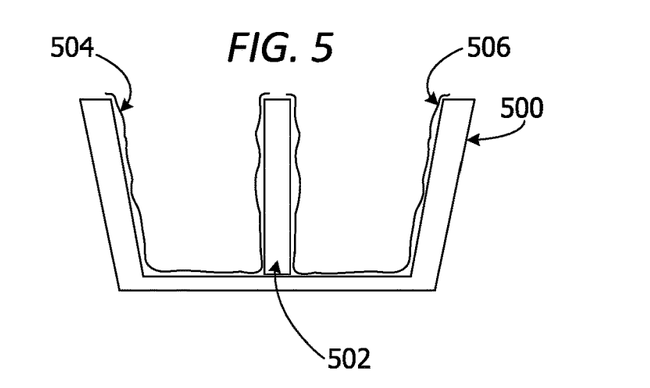
FIG. 5 is an exemplary block diagram illustrating a cross-section view of a set of non-rigid containers on a support frame.

FIG. 5 is an exemplary block diagram illustrating a cross-section view of a set of non-rigid containers on a support frame. In this example, the support frame is a tote 500. The tote 500 includes a single divider 502 creating two compartments within the interior of the tote 500. The tote 500 in this example is supporting a set of non-rigid containers, including a bag 504 and a bag 506. The robotic device can place items into each of the bags 504 and 506 during the automated bagging process.

Figure 6:
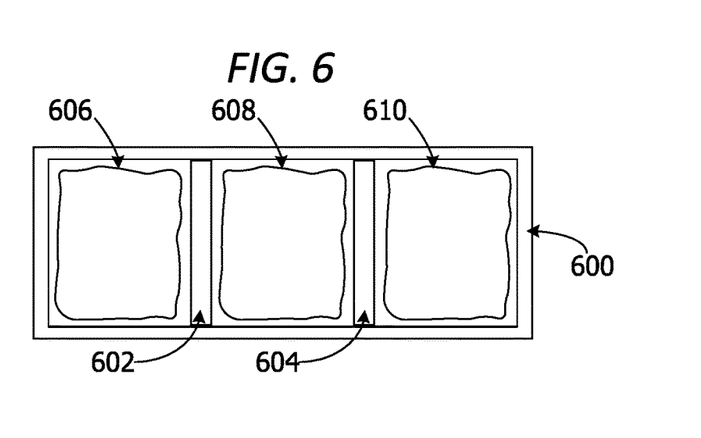
FIG. 6 is an exemplary block diagram illustrating a cross-section view of a set of non-rigid containers on a support frame including a set of dividers.

FIG. 6 is an exemplary block diagram illustrating a cross-section view of a set of non-rigid containers on a support frame including a set of dividers. In this non-limiting example, the support frame is a tote 600 having a first divider 602 and a second divider 604 creating three separate compartments within the interior of the tote 600. In this example, the tote supports a first bag 606, a second bag 608 and a third bag 610. The robotic device can place items into the bag 606, the bag 608 and the bag 610 during the order bagging process.

Figure 7:
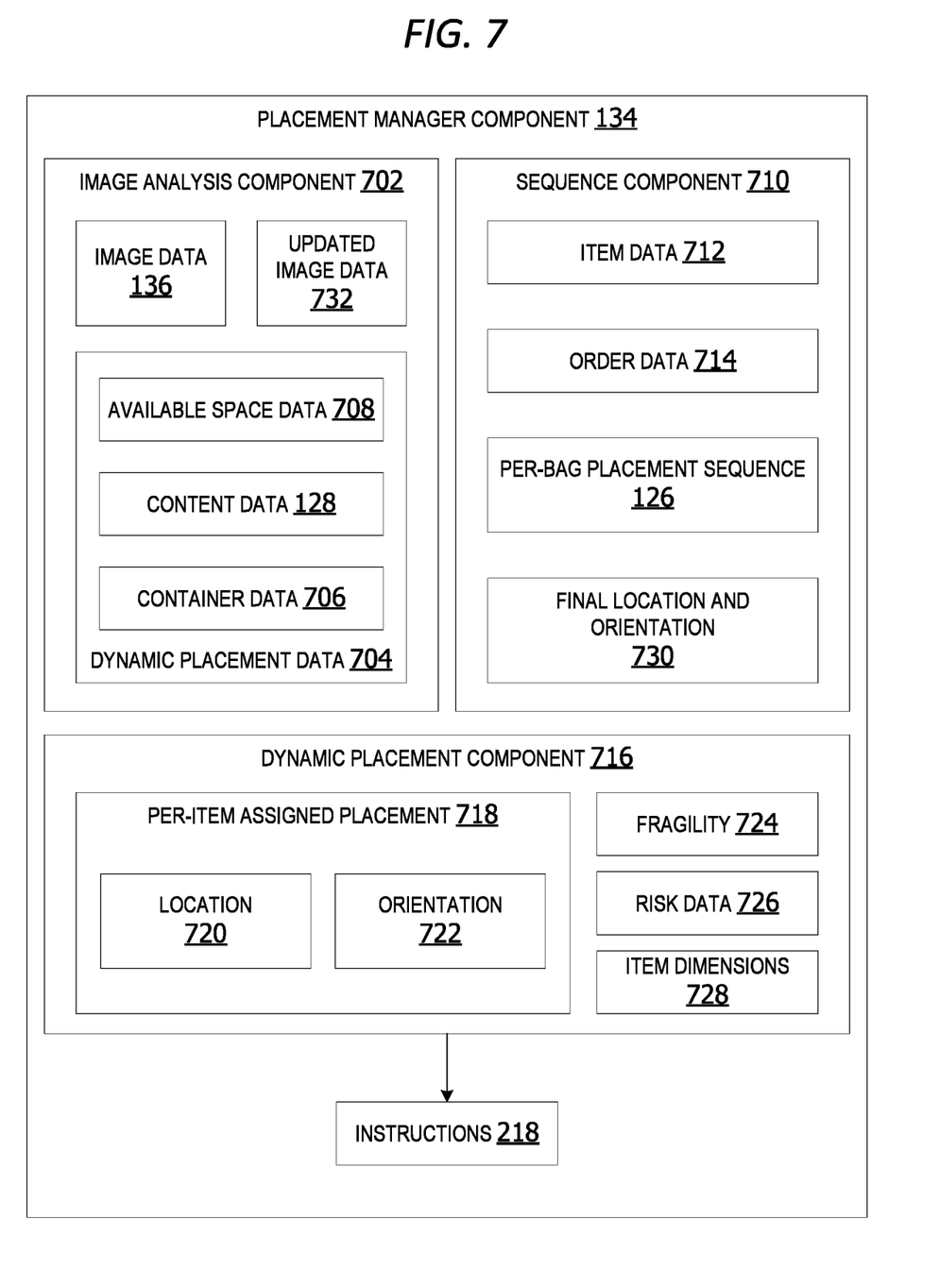
FIG. 7 is an exemplary block diagram illustrating a placement manager component for dynamic item placement into non-rigid containers.

FIG. 7 is an exemplary block diagram illustrating a placement manager component 134 for dynamic item placement into non-rigid containers. In some examples, the placement manager component 134 includes an image analysis component 702. The image analysis component 702 analyzes image data 136 generated by the set of sensor devices to generate dynamic placement data 704. The dynamic placement data 704 is data describing the non-rigid container and/or the contents of the non-rigid container.

The image analysis component analyzes dynamic image data to determine where and how current items should be placed into a bag or other flexible container. The image analysis also identifies the shape of the bag, the boundaries of the bag and/or identifies items already in the bag. The image analysis component further determines the depth of the bag and remaining unoccupied volume within the bag.

In some examples, the dynamic placement data 704 includes available space data 708 identifying an amount or volume of available unoccupied space within the interior of the non-rigid container. The available space can also include space which would be available if the non-rigid container is stretched or filled to capacity based on the type of non-rigid container. The available space is variable depending on the size of the bag, the shape of the bag, thickness of the bag, whether the item is empty or partially filled, and/or the size and shape of the support frame. The available space can also vary within the same bag on the same support frame even where the bag is empty depending on how many dividers are present within a support frame, such as, a tote.

The dynamic placement data 704 can also include content data 128 identifying items already placed within the non-rigid container. The content data 128 can include item data 712 describing the items, such as, but not limited to, dimensions of the item, fragility of the item, weight of the item, item packaging, etc.

Container data 706 in some examples include data describing the type of non-rigid container. The type of container can include paper, plastic, cloth, etc. If the container is plastic, the container may be capable of stretching or being pulled taut to increase available capacity without tearing or compromising strength/integrity of the non-rigid container (bag).

Order data 714 in some examples is data associated with a user (customer's) order. The order can be an online grocery order or any other type of order for items a user has purchased or wants to purchase for delivery or pickup by the user. The order data identifies the set of items needed to fulfill a given order for a customer or other user.

A sequence component 710 analyzes item data 712 for items included in a customer order to generate a per-bag placement sequence 126 for items picked to fulfill the order. The per-bag placement sequence 126 specifies which item should be placed into a given bag first, which item should be placed into the bag second, and so forth. The sequence is generated to prevent heavy items from being placed on top of fragile items. The sequence is also created to ensure the maximum number of items are placed into each bag without compromising the integrity of each bag.

A dynamic placement component 716 in some examples analyzes the per-bag placement sequence and/or the dynamic placement data 704 to generate a per-item assigned placement 718 within the non-rigid container for each item in the set of items assigned to be placed within the non-rigid container. The per-item assigned placement 718 includes an assigned location 720 within the container for the item and an assigned orientation 722 for the item.

The location 720 is the place within the bag where the item should be placed relative to the boundaries of the bag, the depth of the bag and/or the position of one or more other items already within the bag.

The orientation 722 is the orientation of the item when it is set down inside the bag. The orientation can include the item sitting upright, the item laying on its side, the item place up-side-down, or any other orientation.

The location 720 and orientation 722 is selected based on the fragility 724 of the item(s), risk data 726 and/or item dimensions 728. The fragility 724 data indicates whether an item is fragile or easily damaged by other items. The risk data 726 indicates how likely it is that an item will damage the bag or other items in the bag. The item dimensions indicate the length, width and/or height of each item.

The placement manager component 134 generates instructions 218 including the per-item assigned placement for a selected item to a robotic device. The robotic device places the selected item into the assigned location within the bag or other non-rigid container based on the instructions 218. During placement of the item, the robotic device rotates the item to conform to the assigned orientation of the item such that the item will sit in the correct orientation after placement into the non-rigid container.

After placement, an item can shift or settle in a different orientation or position than intended. The placement manager component 134 in these examples analyzes updated image data 732 generated after the selected item is placed into the non-rigid container. The placement manager component 134 generates a final location and orientation 730 of the selected item within the non-rigid container based on the updated image data 732. In other examples, the per-bag placement sequence 126 is also updated based on the final location and orientation 730 of the selected item if the final location and orientation changes the amount of available space within the non-rigid container and/or location of fragile items within the container.

In some examples, dynamic placement location for each item is determined based on factors such as, but not limited to, volume of a bag when empty, remaining unoccupied volume of a partially full bag, volume of items in the bag, number of items that will fit into the bag and/or number of items assigned to each bag.

Figure 8:
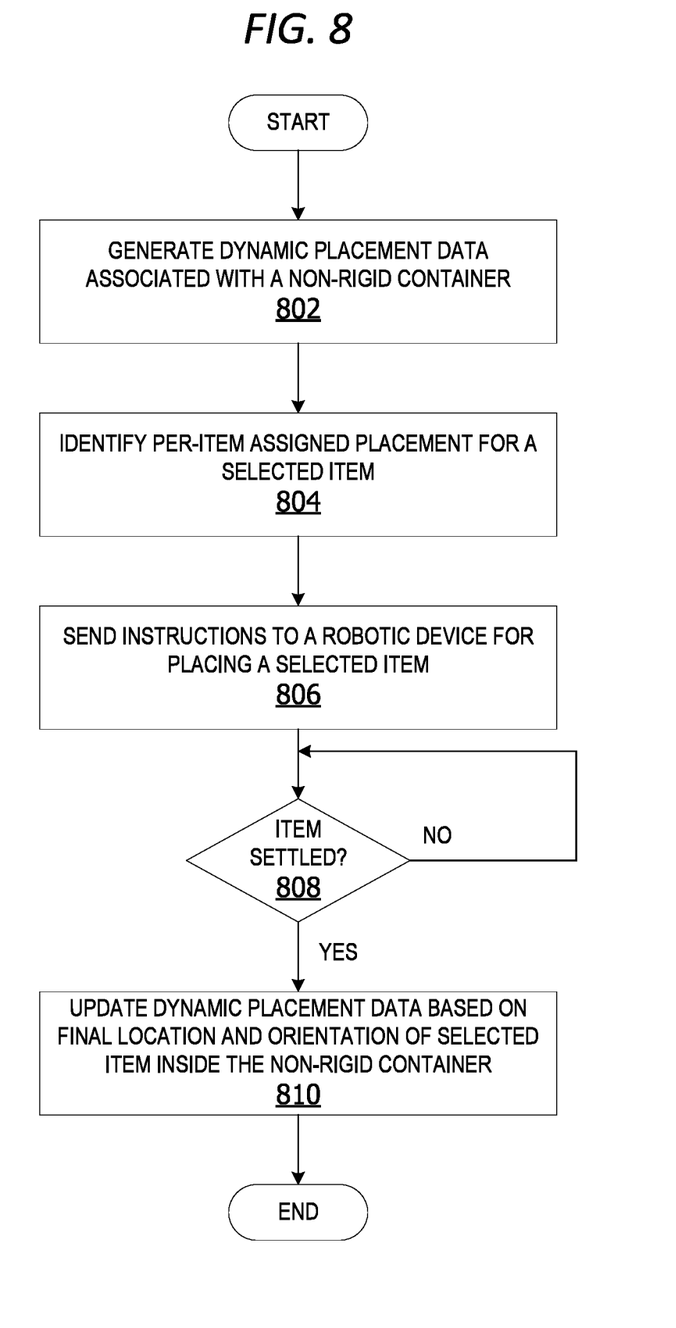
FIG. 8 is an exemplary flow chart illustrating operation of the computing device to dynamically place items into a non-rigid container.

FIG. 8 is an exemplary flow chart illustrating operation of the computing device to dynamically place items into a non-rigid container. The process shown in FIG. 8 is performed by a placement manager component, executing on a computing device, such as the computing device 102 in FIG. 1.

The process begins by generating dynamic placement data associated with a non-rigid container at 802. The dynamic placement data is data describing a non-rigid container and/or the contents of the non-rigid container, such as, but not limited to, the dynamic placement data 704 in FIG. 4.

The non-rigid container is a bag, sack or other flexible container, such as, but not limited to, the non-rigid container 204 in FIG. 2.

The placement manager component identifies per-item assigned placement for a selected item at 804. The per-item assigned placement includes the assigned location and/or the assigned orientation of the selected item. The placement manager component sends the instructions to a robotic device for placing a selected item at 806. The placement manager component determines if the item is settled at 808. An item is settled after being placed into a bag or other non-rigid container after it has settled into its final location and orientation within the non-rigid container. If yes, the placement manager component updates the dynamic placement data based on the final location and orientation of the selected item inside the non-rigid container at 810. The process terminates thereafter.

While the operations illustrated in FIG. 8 are performed by a computing device, aspects of the disclosure contemplate performance of the operations by other entities. In a non-limiting example, a cloud service performs one or more of the operations.

Figure 9:
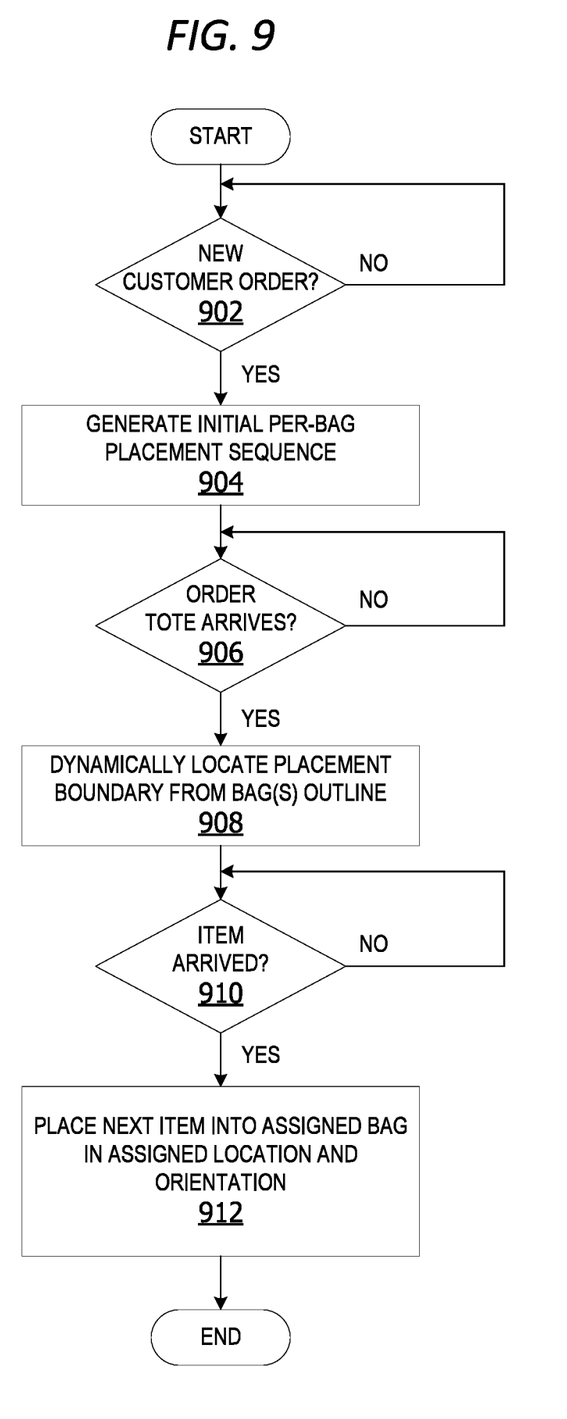
FIG. 9 is an exemplary flow chart illustrating operation of the computing device to dynamically place items into a non-rigid container based on a per-bag placement sequence.

FIG. 9 is an exemplary flow chart illustrating operation of the computing device to dynamically place items into a non-rigid container based on a per-bag placement sequence. The process shown in FIG. 9 is performed by a placement manager component, executing on a computing device, such as the computing device 102 in FIG. 1.

The process begins by determining if a new customer order is received at 902. If yes, the placement manager component generates an initial per-bag placement sequence at 904. The per-bag placement sequence is a sequence in which two or more items should be placed into a non-rigid container, such as, but not limited to, the per-bag placement sequence 126 in FIG. 1. The placement manager component determines if an order tote has arrived at 906. The order tote is a rigid container holding picked items for fulfilling an order. If the order tote arrives at 906, the placement manager component dynamically locates a placement boundary from one or more bag(s) outline at 908. The placement manager component determines if a next item has arrived for placement into the non-rigid container at 910. If yes, the placement manager component places the next item into assigned bag in the assigned location and orientation within the bag at 912. The process terminates thereafter.

While the operations illustrated in FIG. 9 are performed by a computing device, aspects of the disclosure contemplate performance of the operations by other entities. In a non-limiting example, a cloud service performs one or more of the operations.

Figure 10:
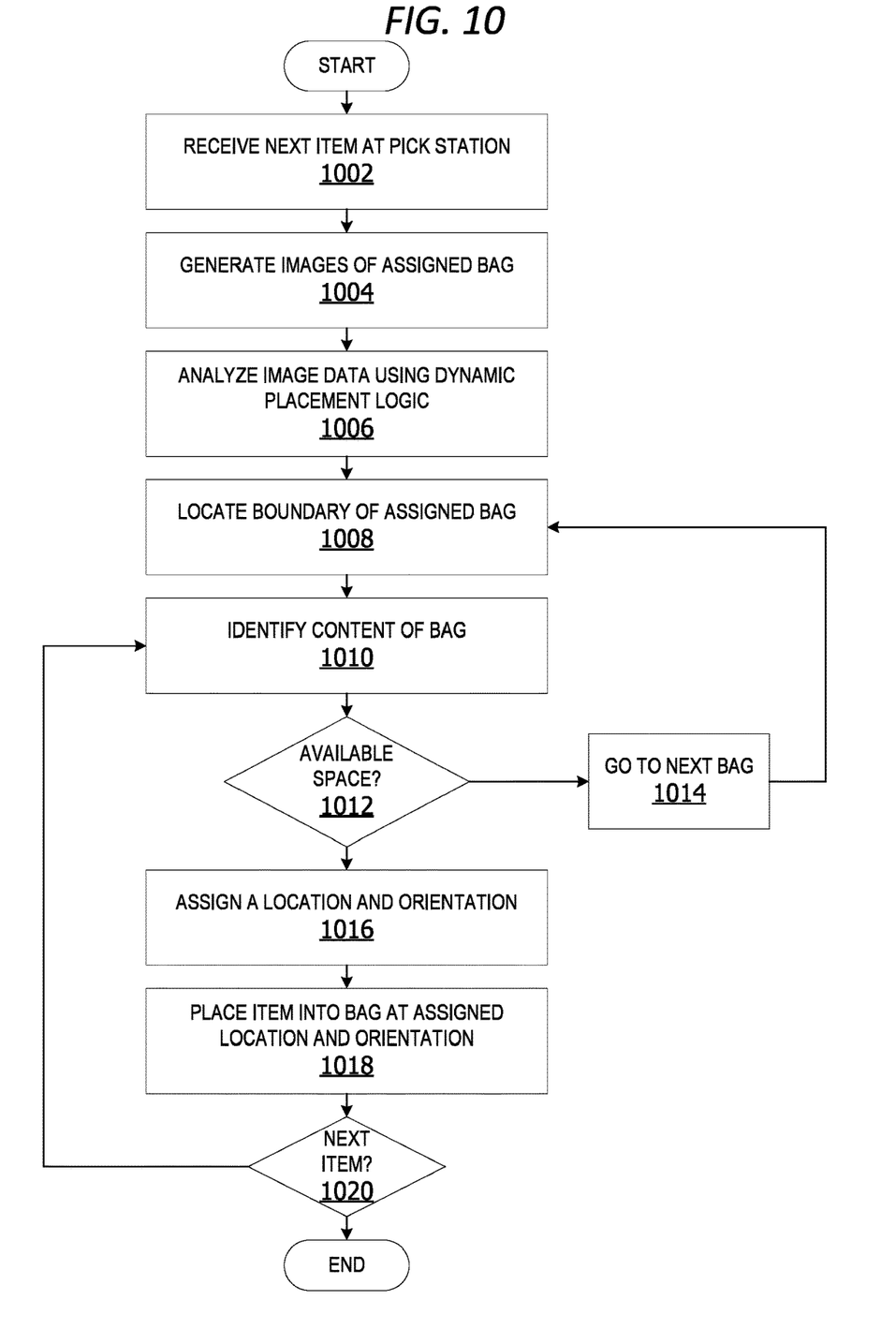
FIG. 10 is an exemplary flow chart illustrating operation of the computing device to assign a location and orientation to a selected item being placed into a non-rigid container.

FIG. 10 is an exemplary flow chart illustrating operation of the computing device to assign a location and orientation to a selected item being placed into a non-rigid container. The process shown in FIG. 10 is performed by a placement manager component, executing on a computing device, such as the computing device 102 in FIG. 1.

The process begins by receiving a next item at a pick station at 1002. The placement manager component generates images of the assigned bag at 1004. The images are generated by one or more image capture devices, such as, but not limited to, the image data 136 in FIG. 1. The placement manager component analyzes the image data using dynamic placement logic at 1006. The placement manager component locates the boundary of the assigned bag at 1008. The placement manager component identifies the contents of the bag at 1010. The placement manager component determines if there is sufficient available space to contain the next item at 1012. If no, the process goes to the next available bag at 1014. The process iteratively executes operations 1008 through 1014 until there is sufficient space in the bag for the next item at 1012.

The placement manager component assigns a location and orientation to the next item at 1016. A robotic device places the item into a bag at the assigned location and orientation at 1018. The placement manager component determines if there is a next item for placement into a bag at 1020. If yes, the placement manager component returns to 1010 and iteratively performs stops 1010 through 1020 until all items are bagged at 1020. When there is no next item left to bag at 1020, the process terminates thereafter.

While the operations illustrated in FIG. 10 are performed by a computing device, aspects of the disclosure contemplate performance of the operations by other entities. In a non-limiting example, a cloud service performs one or more of the operations.

Figure 11:
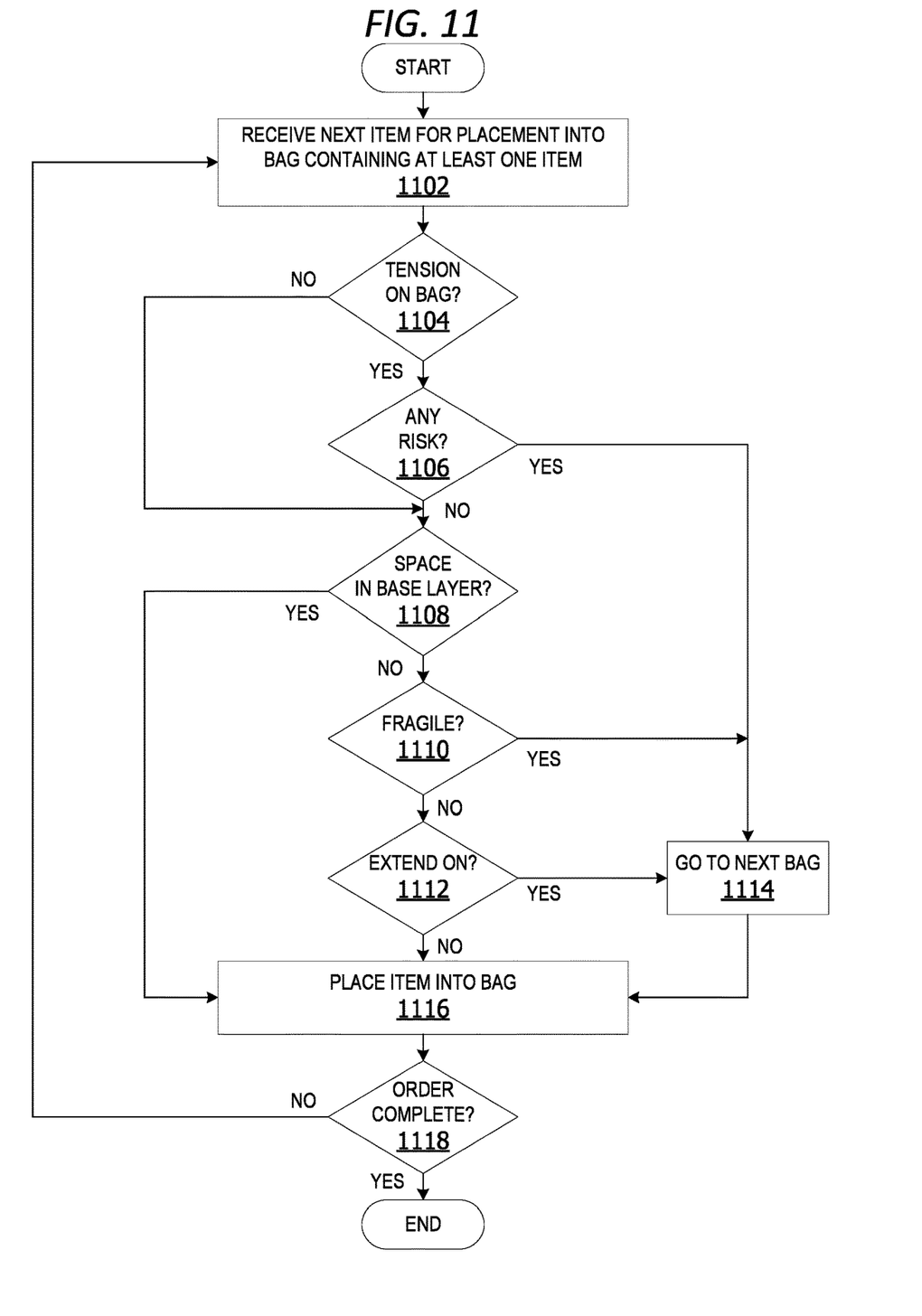
FIG. 11 is an exemplary flow chart illustrating operation of the computing device to dynamically place items into a non-rigid container based on dynamic placement data.

FIG. 11 is an exemplary flow chart illustrating operation of the computing device to dynamically place items into a non-rigid container based on dynamic placement data. The process shown in FIG. 11 is performed by a placement manager component, executing on a computing device, such as the computing device 102 in FIG. 1.

The process begins by receiving a next item for placement into a bag containing at least one item at 1102. The placement manager component determines if there is any tension in the bag at 1104. The tension results due to one or more items inside the bag pulling on the sides of the bag. The placement manager component determines if there is any risk of potential damage to the bag or other items inside the bag due to placing the item into the bag at 1106. If yes, the placement manager component goes to the next bag at 1114. The placement manager component places the item into the next bag at 1116. The placement manager component determines if the order is complete at 1118. If no, the placement manager component iteratively performs operations 1102 through 1118 until the order is complete at 1118. The process terminates thereafter.

Returning to 1106, if placing the item into the bag does not pose any risk of puncturing the bag or damaging other items in the bag, the placement manager component determines if there is space available at the base layer at 1108. The base layer is the bottom layer of the bag. An item placed into the bag at the base layer rests on the bottom of the bag without sitting on top of any other items inside the bag. If there is space available at the base layer, the item is placed into the bag at 1116. If the order is complete at 1118, the process terminates thereafter.

Returning now to 1108, if there is no space available in the base layer, the placement manager component determines if the next item is fragile at 1110. If yes, the placement manager component goes to the next bag at 1114. The placement manager component places the fragile item into the next bag at 1116. If the order is complete at 1118, the process terminates thereafter.

If the item is not fragile at 1110, the placement manager component determines if the selected item will extend out of the bag at 1112. If yes, the placement manager component determines if the next item is fragile at 1110. If yes, the placement manager component goes to the next bag at 1114. The placement manager component places the fragile item into the next bag at 1116. If the order is complete at 1118, the process terminates thereafter.

If the item would not extend out of the bag, the placement manager component places the fragile item into the next bag at 1116. If the order is complete at 1118, the process terminates thereafter.

While the operations illustrated in FIG. 11 are performed by a computing device, aspects of the disclosure contemplate performance of the operations by other entities. In a non-limiting example, a cloud service performs one or more of the operations.

Additional Examples

In some examples, robots are provided for placing items into non-rigid containers supported on a frame, such as, but not limited to, one or more bags supported inside a rigid tote, box or other frame. The lay of the bag, as well as the size and orientation of previously placed items inside the bag, affects how the item placed into the bag settles. The robot's mounted camera captures images of the inside of the bag and/or any items already placed into the bag. The system uses machine vision and dynamic placement logic for placing picked items into the non-rigid container(s).

In an example scenario, the system analyzes the image data generated by one or more cameras using machine vision to determine the shape of the bag and the arrangement of already-placed items. The system utilizes the dynamic placement logic to determine where and how the next item should be placed into the bag to achieve a desired end position and orientation. The next item to be placed into the bag is selected based on a predetermined item sequence.

Alternatively, or in addition to the other examples described herein, examples include any combination of the following:

- a communications interface component, implemented on the at least one processor, sends a set of instructions to at least one robotic device, the set of instructions including the per-item assigned placement for the selected item, wherein the robotic device places the selected item into the non-rigid container based on the set of instructions;
- the image analysis component analyzes the image data to identify at least one of an amount of tension in a non-rigid container having one or more items already placed inside the non-rigid container and a degree of fragility of the set of items already placed inside the non-rigid container;
- a set of arms associated with the robotic device, wherein the robotic device picks up the selected item using at least one arm in the set of arms, and wherein the selected item is lowered into the interior of the non-rigid container by the at least one arm;
- a set of sensor devices generating sensor data associated with the set of items already placed within the interior of the non-rigid container;
- a tote subdivided into at least two compartments, wherein each compartment supports at least one non-rigid container for storing one or more items;
- a cloud server, wherein the set of image capture devices transmits the image data to the cloud server for analysis to identify the per-item placement of each item being placed into the non-rigid container during bagging in real-time;
- at least one camera mounted on the robotic device generating at least a portion of the image data;
- at least one camera mounted above the non-rigid container generating at least a portion of the image data;
- generating, by an image analysis component, dynamic placement data associated with the non-rigid container based on image data received from a set of image capture devices associated with a non-rigid container;
- the dynamic placement data including available space data indicating volume of unoccupied space within the non-rigid container and bag content data identifying a set of items already placed within an interior of the non-rigid container;
- identifying, by a dynamic placement component, a per-item assigned placement for a selected item ready for placement into the non-rigid container based on the per-bag placement sequence and the dynamic placement data;
- the per-item assigned placement comprising a location within the interior of the non-rigid container and an orientation of the selected item after placement into the non-rigid container;
- sending, by a communications interface component, a set of instructions to at least one robotic device configured to place the selected item into the interior of the non-rigid container in accordance with the per-item assigned placement within the non-rigid container;
- updating, by a sequence component, the per-bag placement sequence based on updated image data showing a final location and orientation of the selected item received from the set of image capture devices after the selected item settles within the non-rigid container;
- analyzing the image data to determine a location and orientation of each item already placed inside the non-rigid container;
- analyzing the image data to identify at least one of an amount of tension in a non-rigid container having one or more items already placed inside the non-rigid container and a degree of fragility of the set of items already placed inside the non-rigid container;
- generating an initial per-bag placement sequence for one or more items associated with a new customer order based on dynamic placement data associated with a next available non-rigid container for bagging the one or more items; and
- analyzing image data associated with an assigned non-rigid container to identify at least one boundary associated with the assigned non-rigid container and available space within the non-rigid container.

At least a portion of the functionality of the various elements in FIG. 1, FIG. 2, FIG. 3, FIG. 4, FIG. 5, FIG. 6 and FIG. 7 can be performed by other elements in FIG. 1, FIG. 2, FIG. 3, FIG. 4, FIG. 5, FIG. 6 and FIG. 7, or an entity (e.g., processor 106, web service, server, application program, computing device, etc.) not shown in FIG. 1, FIG. 2, FIG. 3, FIG. 4, FIG. 5, FIG. 6 and FIG. 7.

In some examples, the operations illustrated in FIG. 8, FIG. 9, FIG. 10 and FIG. 11 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method for autonomously placing items into non-rigid containers by a set of robotic devices, the method comprising generating dynamic placement data associated with the non-rigid container based on image data received from a set of image capture devices associated with a non-rigid container; identifying a per-item assigned placement for a selected item ready for placement into the non-rigid container based on the per-bag placement sequence and the dynamic placement data; sending a set of instructions to at least one robotic device configured to place the selected item into the interior of the non-rigid container in accordance with the per-item assigned placement within the non-rigid container; and updating the dynamic placement data based on a final location and orientation of the selected item after placement of the selected item inside the non-rigid container.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for a robotic device to autonomously place items into non-rigid containers. For example, the elements illustrated in FIG. 1, FIG. 2, FIG. 3, FIG. 4, FIG. 5, FIG. 6 and FIG. 7, such as when encoded to perform the operations illustrated in FIG. 8, FIG. 9, FIG. 10 and FIG. 11, constitute exemplary means for generating dynamic placement data associated with the non-rigid container based on image data received from a set of image capture devices associated with a non-rigid container; identifying a per-item assigned placement for a selected item ready for placement into the non-rigid container based on the per-bag placement sequence and the dynamic placement data; sending a set of instructions to at least one robotic device configured to place the selected item into the interior of the non-rigid container in accordance with the per-item assigned placement within the non-rigid container; and exemplary means for updating the dynamic placement data based on a final location and orientation of the selected item after placement of the selected item inside the non-rigid container.

Other non-limiting examples provide one or more computer storage devices having a first computer-executable instructions stored thereon for placing items into non-rigid containers by a placement manager component. When executed by a computer, the computer performs operations including generating dynamic placement data associated with the non-rigid container; identifying a per-item assigned placement for a selected item ready for placement into the non-rigid container based on the per-bag placement sequence and the dynamic placement data; and sending instructions for placing the item into the non-rigid container in accordance with the per-item assigned placement to a robotic device configured to place the selected item into the non-rigid container in accordance with the instructions.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein.

For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data can include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI can be discarded depending upon the degree to which such KRI has any value based on local processing and evaluation of such KRI. In an exemplary embodiment, KRI may not even be utilized in any form if it is determined that KRI is transient and can be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which can, for example, reflect generic background data. In an exemplary embodiment, KRG incrementally sequences all future undefined cached kernels of data to filter out data that can reflect generic background data. In an exemplary embodiment, KRG further incrementally sequences all future undefined cached kernels having encoded asynchronous data to filter out data that can reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for item placement into non-rigid containers, the system comprising:
   a set of image capture devices generating image data associated with a non-rigid container;
   an image analysis component, implemented on at least one processor, generates dynamic placement data associated with the non-rigid container, wherein the dynamic placement data comprises at least one of available space data associated with unoccupied space within the non-rigid container and bag content data associated with a set of items already placed within an interior of the non-rigid container;
   a dynamic placement component, implemented on the at least one processor, identifies a per-item assigned placement for a selected item ready for placement into the non-rigid container based on a per-bag placement sequence and the dynamic placement data, the per-item assigned placement comprising a location within the interior of the non-rigid container and an orientation of the selected item after placement into the non-rigid container;
   a robotic device configured to place the selected item into the interior of the non-rigid container in accordance with the per-item assigned placement within the non-rigid container; and
   the image analysis component, implemented on the at least one processor, updates the dynamic placement data based on a final location and orientation of the selected item after placement of the selected item inside the non-rigid container.

2. The system of claim 1, further comprising:
   a communications interface component, implemented on the at least one processor, sends a set of instructions to at least one robotic device, the set of instructions including the per-item assigned placement for the selected item, wherein the robotic device places the selected item into the non-rigid container based on the set of instructions.

3. The system of claim 1, further comprising:
   the image analysis component analyzes the image data to identify at least one of an amount of tension in the non-rigid container having one or more items already placed inside the non-rigid container and a degree of fragility of the set of items already placed inside the non-rigid container.

4. The system of claim 1, further comprising:
   a sequence component, implemented on the at least one processor, updates the per-bag placement sequence based on updated image data showing a final location and orientation of the selected item received from the set of image capture devices after the selected item settles within the non-rigid container.

5. The system of claim 1, further comprising:
   a set of sensor devices generating sensor data associated with the set of items already placed within the interior of the non-rigid container.

6. The system of claim 1, further comprising:
   a tote subdivided into at least two compartments, wherein each compartment supports at least one non-rigid container for storing one or more items.

7. The system of claim 1, further comprising:
   a cloud server, wherein the set of image capture devices transmits the image data to the cloud server for analysis to identify a per-item placement of each item being placed into the non-rigid container during bagging in real-time.

8. The system of claim 1, further comprising:
   at least one camera mounted on the robotic device generating at least a portion of the image data.

9. The system of claim 1, further comprising:
at least one camera mounted above the non-rigid container generating at least a portion of the image data.

10. A computer-implemented method for placing items into non-rigid containers by a set of robotic devices, the computer-implemented method comprising:
generating, by an image analysis component, dynamic placement data associated with a non-rigid container based on image data received from a set of image capture devices associated with the non-rigid container, the dynamic placement data including available space data indicating volume of unoccupied space within the non-rigid container and bag content data identifying a set of items already placed within an interior of the non-rigid container;
identifying, by a dynamic placement component, a per-item assigned placement for a selected item ready for placement into the non-rigid container based on a per-bag placement sequence and the dynamic placement data, the per-item assigned placement comprising a location within the interior of the non-rigid container and an orientation of the selected item after placement into the non-rigid container;
sending, by a communications interface component, a set of instructions to at least one robotic device configured to place the selected item into the interior of the non-rigid container in accordance with the per-item assigned placement within the non-rigid container; and
updating, by the image analysis component, the dynamic placement data based on a final location and orientation of the selected item after placement of the selected item inside the non-rigid container.

11. The computer-implemented method of claim 10, further comprising:
updating, by a sequence component, the per-bag placement sequence based on updated image data showing a final location and orientation of the selected item received from the set of image capture devices after the selected item settles within the non-rigid container.

12. The computer-implemented method of claim 10, further comprising:
placing, by a robotic device, the selected item into the interior of the non-rigid container in accordance with the per-item assigned placement within the non-rigid container.

13. The computer-implemented method of claim 10, further comprising:
analyzing the image data to determine a location and orientation of each item already placed inside the non-rigid container.

14. The computer-implemented method of claim 10, further comprising:
analyzing the image data to identify at least one of an amount of tension in the non-rigid container having one or more items inside and a degree of fragility of the set of items already placed inside the non-rigid container.

15. The computer-implemented method of claim 10, further comprising:
generating the per-bag placement sequence for one or more items associated with a new order based on dynamic placement data associated with a next available non-rigid container for bagging the one or more items.

16. The computer-implemented method of claim 10, further comprising:
analyzing the image data associated with an assigned non-rigid container to identify at least one boundary associated with the assigned non-rigid container and available space within the assigned non-rigid container.

17. One or more computer storage devices, having computer-executable instructions for a placing items into non-rigid containers by a placement manager component that, when executed by a computer cause the computer to perform operations comprising:
generating dynamic placement data associated with a non-rigid container, wherein the dynamic placement data comprises at least one of available space data associated with unoccupied space within the non-rigid container and bag content data associated with a set of items already placed within an interior of the non-rigid container;
identifying a per-item assigned placement for a selected item ready for placement into the non-rigid container based on a per-bag placement sequence and the dynamic placement data, the per-item assigned placement comprising a location within the interior of the non-rigid container and an orientation of the selected item after placement into the non-rigid container; and
sending instructions for placing the item into the non-rigid container in accordance with the per-item assigned placement to a robotic device configured to place the selected item into the non-rigid container in accordance with the instructions.

18. The one or more computer storage devices of claim 17, wherein the placement manager component, when further executed by a computer, causes the computer to perform operations comprising:
updating the dynamic placement data based on a final location and orientation of the selected item after placement of the selected item inside the non-rigid container.

19. The one or more computer storage devices of claim 17, wherein the placement manager component, when further executed by a computer, causes the computer to perform operations comprising:
updating the per-bag placement sequence based on updated image data showing a final location and orientation of the selected item received from a set of image capture devices after the selected item settles within the non-rigid container.

20. The one or more computer storage devices of claim 17, wherein the placement manager component, when further executed by a computer, causes the computer to perform operations comprising:
analyzing image data associated with an assigned non-rigid container to identify at least one boundary associated with the assigned non-rigid container and available space within the assigned non-rigid container.

* * * * *